Nov. 10, 1970
L. M. GREENE
3,539,987
AUTOMATIC REGULATOR FOR ANNUNCIATOR
LIGHTS IN AIRPLANE COCKPITS
Filed July 14, 1967
3 Sheets-Sheet 1
FIG. 1
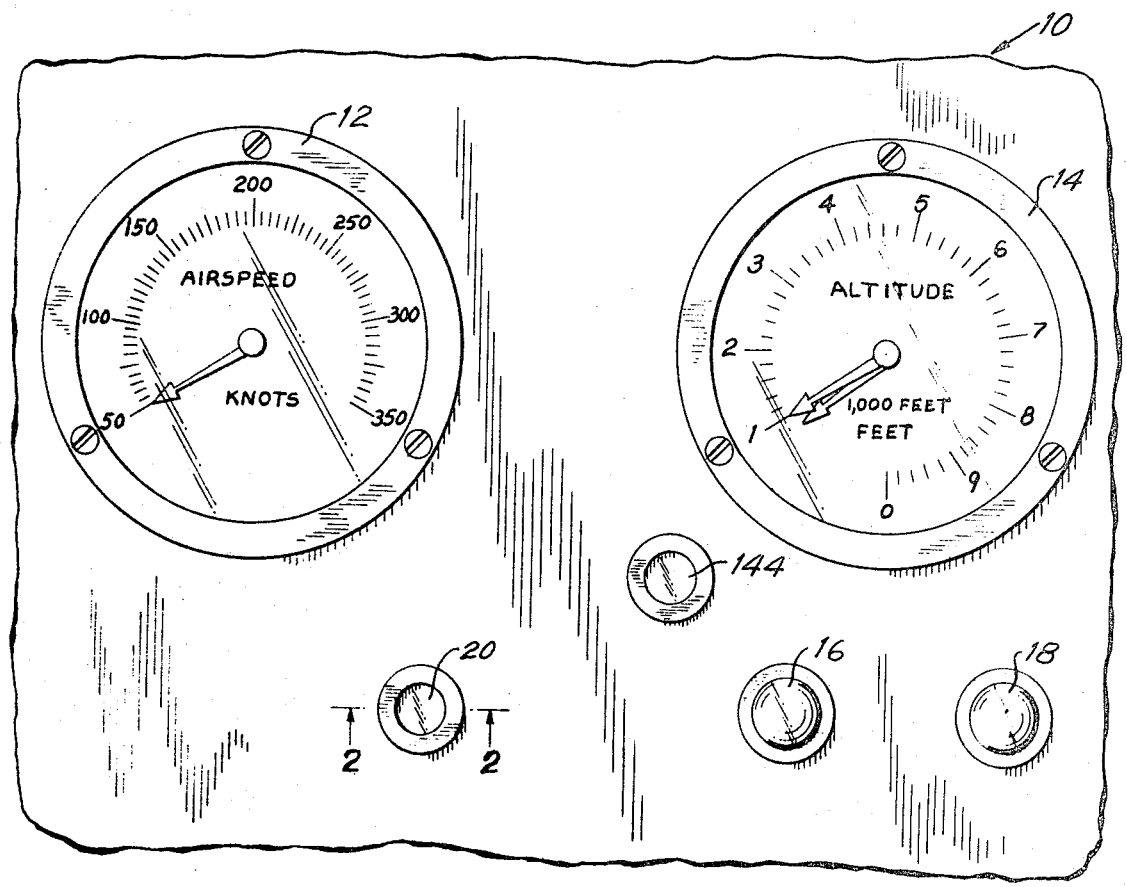
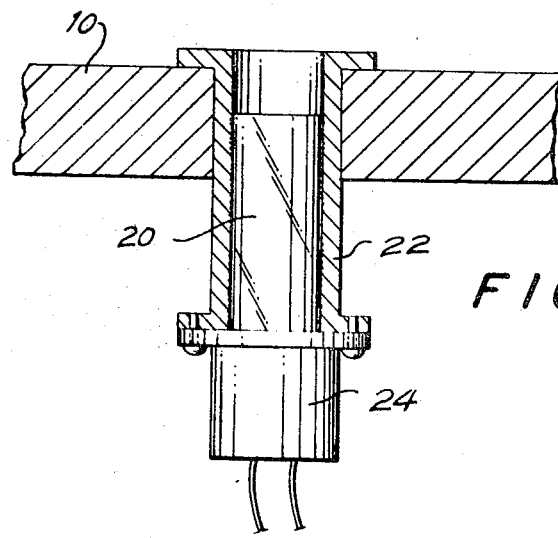
FIG. 2
INVENTOR.
LEONARD M. GREENE
BY
ATTORNEY

INVENTOR.
LEONARD M. GREENE

ATTORNEY

United States Patent Office 3,539,987
Patented Nov. 10, 1970

3,539,987
AUTOMATIC REGULATOR FOR ANNUNCIATOR LIGHTS IN AIRPLANE COCKPITS
Leonard M. Greene, Chappaqua, N.Y., assignor to Safe Flight Instrument Corp., White Plains, N.Y., a corporation of New York
Filed July 14, 1967, Ser. No. 653,518
Int. Cl. G01j 1/32; G05d 25/00
U.S. Cl. 340—27
6 Claims

ABSTRACT OF THE DISCLOSURE

A system comprising annunicator lights which upon the occurrence of predetermined events are energized from an annunicator bus that is supplied with a voltage that is a function of the level of light within the airplane cockpit as measured by a photocell.

BACKGROUND OF THE INVENTION

Field of the invention

An automatic regulator that varies the voltage on an annunciator bus for condition-energized warning lights in an airplane cockpit as a function of ambient light conditions in the cockpit.

Description of the prior art

It is conventional to provide one or more condition-actuated warning lights in the cockpit of an airplane. These will vary from a few such lights in a light plane to a considerable number in a large or sophisticated airplane. The lights are employed to warn a pilot of the advent of predetermined conditions which might be an airplane parameter such as incipient stall or a change in mode such as the landing gear being retracted when the airplane is about to land. Typical conditions which are sensed by conventional sensing means and of whose existence the airplane pilot is advised by the warning lights are the following: flaps up when the airplane is about to land, collision warning, wheels up when the airplane is about to land, automatic throttle system disconnect, stall warning, engine fire warning, cabin fire warning, automatic pilot disconnect, radio failure, flight director failure, instrument failure, electrical power failure, hydraulic pressure failure, engine danger, such as reversing, radio markers, and minimum altitude.

At the present time, warnings of these events are signalled to the airplane pilot by energization of a light source, e.g., a lamp, in the cockpit, usually on the instrument panel. These lamps are conventionally termed "annunciator lights."

The level, i.e., intensity of illumination of annunciator lights must be such that the lights will immediately catch the eye and attention of the pilot. Inasmuch as considerable flying is done in broad daylight when sunlight floods the cockpit, the intensity of illumination of annunciator lights should be quite high and in practice is very high. Any lesser intensity would render annunciator light valueless. However, this has created a serious problem which has jeopardized the safety of airplanes. The problem is that when the ambient light conditions in the cockpit are at less than full brilliance, the sudden energization of a brilliant annunciator light to warn the pilot of some condition which usually is one of approaching or existing danger will temporarily blind the pilot by dazzling him just as if a flashlight bulb had exploded in front of him. This danger increases as the ambient light conditions in the cockpit reduce and is at its worst at nighttime when the light in the cockpit is at a very low level and the energization of a brilliant annunciator light will so temporarily blind a pilot that he becomes ineffective to counter the emergency.

By way of example, an annunciator light may indicate that the automatic throttle has been disconnected. This becomes effective when an airplane is a short distance above the ground, for instance 30 feet, and is rapidly settling. The light warns the pilot that the automatic throttle is no longer in operation. However consider what happens when this takes place at nighttime; the light suddenly flashes on and by its brilliance temporarily blinds the pilot. At this very moment, when he is incapacitated, the pilot must reach out and assume manual throttle control which requires the use of this one free hand. He must do this, i.e., locate and operate the manual throttle, when he cannot visually perceive the same. In other words, he must do it by his sense of orientation, a very dangerous procedure. Also he has temporarily lost his vision when he must be able to see where he is to land in a few moments. Moreover he will at the same time be trying to squelch, i.e., cut off the annunciator light and will be torn between two desires, i.e., whether to first dim the annunciator light or first to assume control of the throttles. The dangerous condition inherent in such procedure has heretofore led some pilots improperly to mask or blackout some or all of their annunciator lights.

SUMMARY OF THE INVENTION

It is another object of the present invention to provide a system which avoids the aforesaid drawbacks.

More particularly it is an object of the present invention to provide a system of the character described which avoids the serious hazard and real danger attendent upon bright energization of an annunciator light in the cockpit of an airplane under conditions of low ambient lighting while still retaining the ability to provide a high intensity of energization of the light in broad daylight.

It is another object of the present invention to provide a system of the character described in which the voltage on the annunciator bus is a function of ambient lighting conditions in an airplane cockpit whereby the aforegoing desirable effect is secured.

It is an other object of the present invention to provide a system of the character described having anunciator lights that are selectively energized from an annunciator bus upon the occurrence of certain predetermined conditions, wherein the voltage on said bus is a function of the light conditions in the airplane cockpit which conditions are observed by a light sensing means.

Other objects of the invention in part will be obvious and in part will be pointed out hereinafter.

The invention accordingly consists in the features of construction, combinations of elements and arrangement of parts which will be exemplified in the system hereinafter described and of which the scope of application will be indicated in the appended claims.

BRIEF DESCRIPTION OF THE DRAWINGS

In the accompanying drawings in which are shown various possible embodiments of the invention, FIG. 1 is a fragmentary front view of an airplane instrument panel embodying the present invention;

FIG. 2 is an enlarged sectional view taken substantially along the line 2—2 of FIG. 1;

DESCRIPTION OF THE PREFERRED EMBODIMENTS

Figure 3:
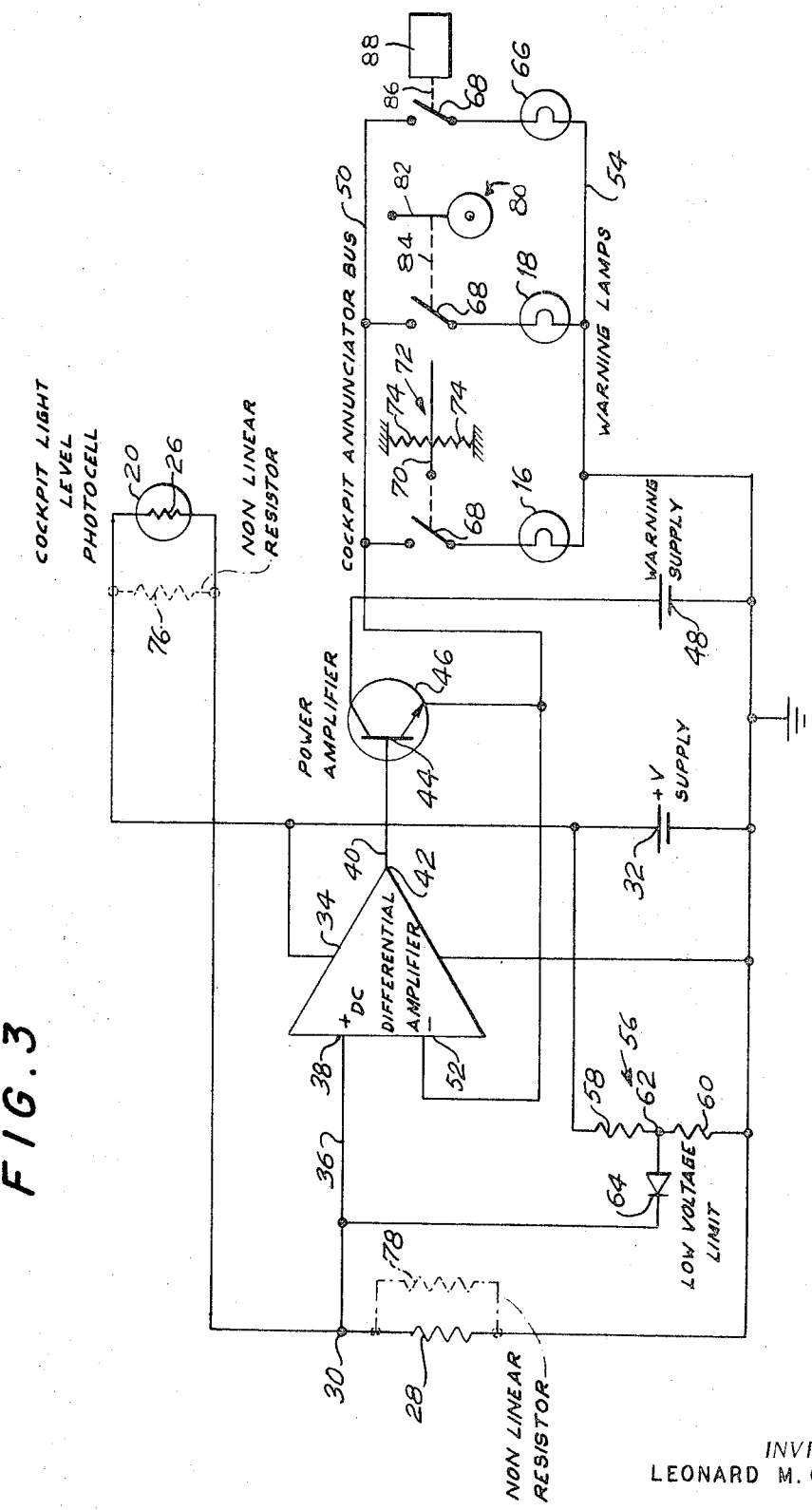
FIG. 3 is a diagram of an electric circuit for carrying out the present invention.

In general, the several objects of the present invention are achieved by providing an annunciator system that includes one or more annunciator lights located, as is usual, at varied positions in the cockpit of an airplane. The annunciator lights are supplied with energy from a common annunciator bus. The lights are connected to the bus through mechanical or electrical switches which in turn are controlled by sundry condition sensing means. Such sensing means are well known in the art and are constructed and situated to respond to certain conditions when they reach a value or a mode of which the pilot should be warned. When the sensing means responds to the condition, it will close an associated switch, causing the associated annunciator light to be actuated. As thus far described, the system is conventional.

The present invention resides in modifying the aforesaid system in a fashion such as to vary the voltage supplied to the annunciator bus as a function of ambient light conditions in the airplane cockpit. To this end, the system further includes a light sensing means in the cockpit, preferably adjacent or even in the instrument panel. The light sensing means may, for example, constitute a photoelectric cell. Desirably, the light sensing means is shielded from the annunciator lights so as not to form a feedback loop. The light sensing means regulates a control means which in turn varies the voltage on the annunciator bus as a function of the aforesaid cockpit ambient light condition.

Referring now specifically to FIG. 1, the reference numeral 10 denotes an airplane instrument panel. Only a fragment of the panel has been illustrated, since the same, save for the presence of the light sensing means, is entirely conventional and representative. The airplane instrument panel is, of course, located in the cockpit of an airplane in front of and, optionally, also portions thereof are situated above, to the sides of, and somewhat below, the pilot, e.g., on a console. As is well known, the cockpit of a modern complex airplane is highly crowded with instruments and the same are placed wherever room for them is found, the more important and more frequently used instruments being located in the more readily visible sites. However, instruments of all types jam the cockpit. The instrument panel is principally located in front of the pilot below the windshield. However, other instruments, as indicated just previously, may be located above the windshield as well as to the sides of the pilot and below the principal instrument panel.

Purely by way of example, a few specific instruments have been shown on the panel 10. These include an air speed indicator 12 and an altimeter 14. Other typical instruments which might be present are engine tachometers, engine temperature, oil pressure and fuel indicators.

Furthermore, there are present within the cockpit sundry annunciator lights of which two lights 16, 18 have been illustrated by way of example. The specific light 16 that has been shown is a stall warning light, that when energized indicates a condition of imminent stall and the specific light 18 that has been shown is a light to indicate, when energized, that the wheels are not down when the airplane is in a landing mode. Exemplificative of other annunciator lights are lights which when energized indicate: that the flaps are up when the airplane is about to land, that a collision is imminent, that the automatic throttle is disconnected, that a fire is present in the engine, that a fire is present in the cabin, that the automatic pilot is disconnected, that there is a radio failure, that there is a flight director failure, that there is an electric power failure, that there is a failure of hydraulic pressure, that there is an engine danger, such as reversing, that a radio marker is being passed, and that a minimum altitude above the ground is present. In each instance, a corresponding annunciator light will be energized.

The annunciator lights can be on the instrument panel below the windshield or can be located above the windshield, or may be located beneath the instrument panel or to either side of the pilot. The particular locations of the annunciator lights are no part of the present invention except that annunciator light must be situated within the cockpit where its overly bright energization under dim lighting conditions represents a danger due to temporary blinding thereby of the pilot.

Furthermore, the system of the present invention includes a light sensing means, such as a photoelectric cell 20, somewhere in the cockpit of the airplane where it will be responsive to the intensity of light in the cockpit. An excellent location for the cell is, as shown, on the airplane instrument panel 10. The cell is mounted in a tubular holder 22 with the light sensitive element of said cell, which is located in a glass envelope, recessed below the external surface of the instrument panel 10. This location is preferably employed to prevent the cell from being sensitive to energization of one or more of the annunciator lights, so that the photoelectric cell will be responsive essentially only to the ambient light conditions in the airplane cockpit. The leads of the cell are joined by a connector 24 to a suitable control circuit such as shown in either one of FIGS. 3 or 4.

Referring to FIG. 3 in which the photoelectric cell has been similarly denoted by the reference numeral 20, the reference numeral 26 denotes the light sensitive element which, in the given example, is such that the resistance increases with decrease in lighting intensity. Said light sensitive element is connected in series with a fixed resistance 28 to form a voltage divider with a junction point 30. The ends of the voltage divider are connected across a DC voltage supply 32. The same voltage supply 32 is connected to supply power to a DC differential amplifier 34. A lead wire 36 runs from the junction point 30 to the non-inverting input terminal 38 of said amplifier 34. Another lead wire 40 connects the output terminal 42 of the amplifier 34 to the control terminal, in this instance, the base 44, of an NPN power transistor 46 connected as an emitter follower. The collector of the transistor is connected to the positive side of a DC warning source of voltage 48 which, as soon will be apparent, is employed to power a cockpit annunciator bus 50. Hence, the voltage on the bus 50 will be a function of the output appearing at the terminal 42 of the amplifier 34.

The emitter of the transistor also is connected by a lead wire to the inverting input terminal 52 of the DC differential amplifier 34. Thereby, the differential amplifier 34 and the power transistor 46 are mutually interconnected in a follower configuration and are so proportioned as to obtain substantially a unity gain.

The negative (ground) side of the warning voltage source 48 is connected to the ground cockpit annunciator bus 54.

It will be apparent that with this arrangement, as the level of light intensity in the cockpit increases to decrease the resistance value of the light sensitive element 26, the voltage at the junction 30 will rise, causing an increase of control voltage to be applied to the non-inverting input terminal 38. This in turn increases the voltage appearing at the control input terminal 44 of the power transistor and raises the voltage on the positive cockpit annunciator bus 50. The voltage on this bus 50 is in effect an "arming" voltage. That is to say, it is a voltage which is available for use, although, as soon will be seen, this voltage does not steadily energize any light. It is merely ready to energize such light as may be switched on by an associated condition responsive means. However, the circuit as thus far described constitutes a control means regulated by the photoelectric cell, which varies the value of the voltage supplied to the annunciator bus 50.

It will also be clear that when the level of light in the cockpit decreases, the resistance 26 increases, thereby lowering the control voltage appearing at the input terminal 38 and corresponding lowering the voltage appearing on the annunciator bus 50.

It is desirable that the voltage on the bus 50 not be reduced below a certain level and for this purpose there is provided a low voltage limit means 56 in the form of a voltage divider constituting a pair of series connected resistors 58, 60 running from the positive side of the DC voltage supply 32 to ground. The junction 62 between the two resistors 58, 60 is connected through a clamping diode 64 to the lead wire 36, so that, regardless of how high a value the resistance 26 reaches with lowering of light in the cockpit, it is assured that a minimum voltage is applied to the non-inverting control input terminal 38 of the DC differential amplifier 34.

A series of annunciator lights 16, 18, 66, as shown, incandescent lamps, are arranged for connection across the annunciator buses 50, 54 in parallel. The lights are not, as previously indicated, permanently connected across these buses. Rather, they are adapted to be connected across the buses upon closure of condition responsive switches. Specifically, each light has in series therewith a different switch 68. These switches are normally open, or more specifically, are open when the condition to be sensed is such that its value or mode is not such as to desire energization of the corresponding annunciator light. Each light and its associated switch forms a combination that is connected across the annunciator buses 50, 54.

Considering the annunciator light 16 and its warning switch 68, it will be seen that this switch is connected in any suitable fashion, as, for example, by a kinematic train 70, to a specific condition sensing means 72. Said condition sensing means 72 is a stall warning device in the form of a vane mounted on the leading edge of an airplane wing and pivoted behind the center of pressure of air thereon. The vane is biased to an intermediate position by counterbalancing springs 74. As is well known, when the center of pressure of air on the vane reaches a certain position relative to the vane, the switch will experience movement which is conveyed by the kinematic train to the switch 68 to close same. This condition occurs shortly before stall. Hence, the closing of the switch 68 is a warning of imminent stall. When the switch closes, the arming voltage on the annunciator bus 50 is directly connected to the light 16 so as to immediately energize the same. However, the intensity of illumination of the light is a function of the control voltage on the lead wire 40 and this in turn is a function of the control voltage on the terminal 38. The voltage on this terminal is governed by the value of the resistance 26 which is regulated by the intensity of light in the airplane cockpit. Thus, the level of the light emitted by the annunciator light 16 when the same is energized is a function of the intensity, i.e., level of light, in the cockpit.

Preferably, as mentioned shortly above, the energization of the light 16 does not substantially affect the intensity of light falling on the photocell 20, so that energization of the light 16 will not by a feedback loop increase its intensity and build up an increasing level of illumination.

This system is highly useful in that it automatically lowers or increases the potential intensity of the annunciator lights when they are energized by the occurrence of a predetermined condition, so that these lights will not dazzle or blind the pilot, but will be properly set to take into account the prevailing light conditions in the airplane cockpit.

It also will be observed that the low voltage limit means 56 functions to prevent the arming voltage on the annunciator bus 50 from dropping too low and thus to prevent the warning lights from ever reaching such a low value of illumination that they would be useless even in an almost dark cockpit.

The foregoing circuit will provide a satisfactory operation. However, it is pointed out that as thus far described the arming voltage supplied to the annunciator bus 50 is an approximately linear function of the voltage appearing at the junction point 30 and is therefore roughly inversely proportional to the resistance value of the light sensitive element 26 which is in turn roughly inversely proportional to the intensity of light impinging therein. By proper selection of component values, the intensity of the light 16 may be arranged to be an approximately linear function of the intensity of the cockpit light. If desired, the circuit may be made more sophisticated so as to more closely approximate such linear relationship by employing non-linear resistors 76, 78 shunted respectively across the light sensitive element 26 and the fixed resistor 28. These non-linear resistors may be of the Varistor, i.e., silicon carbide, type.

As has been mentioned, each one of the switches 68 is controlled by a different condition sensing means. By way of illustration, the condition sensing means 80 that controls the switch 68 for the annunciator lamp 18 is a strut 82 on a retractable landing gear. This strut is connected by a link 84 to the switch 68 in such fashion that when the landing gear is up, the switch 68 is closed, providing that the airplane is in a landing mode.

The annunciator light 66 is controlled through a kinematic transmitting means 86 connecting its switch 68 to a condition sensing means 88 which has been shown in the form of a block to generically represent anyone of a plurality of condition sensing means all of which are well known to the art. Thus, the condition sensing means 88 can include any one of the following standard condition sensing devices: a mechanical element movable with the airplane flaps and which will close the switch 68 associated with the light 66 when the flaps are up at such time as the airplane is in a landing mode; a collision warning device; a device responsive to the condition of the automatic throttle system and which will close the switch 68 when the automatic throttle system is disconnected from the throttles; a thermostat which senses an engine temperature is too high; a thermostat in the cabin which will close the switch 68 when the cabin temperature is so high as to indicate the presence of a fire; a device which monitors the radio and which closes the switch 68 when the radio fails; a device which monitors the operation of the flight director and which will close the switch 68 when the flight director fails to function; a device which monitors the presence of electrical power in the airplane and which will close the switch 68 when the electrical power fails; a pressure switch which monitors hydraulic pressure in the hydraulic power supply of the airplane and which will close the switch when the hydraulic pressure falls below a certain value, etc.

Figure 4:
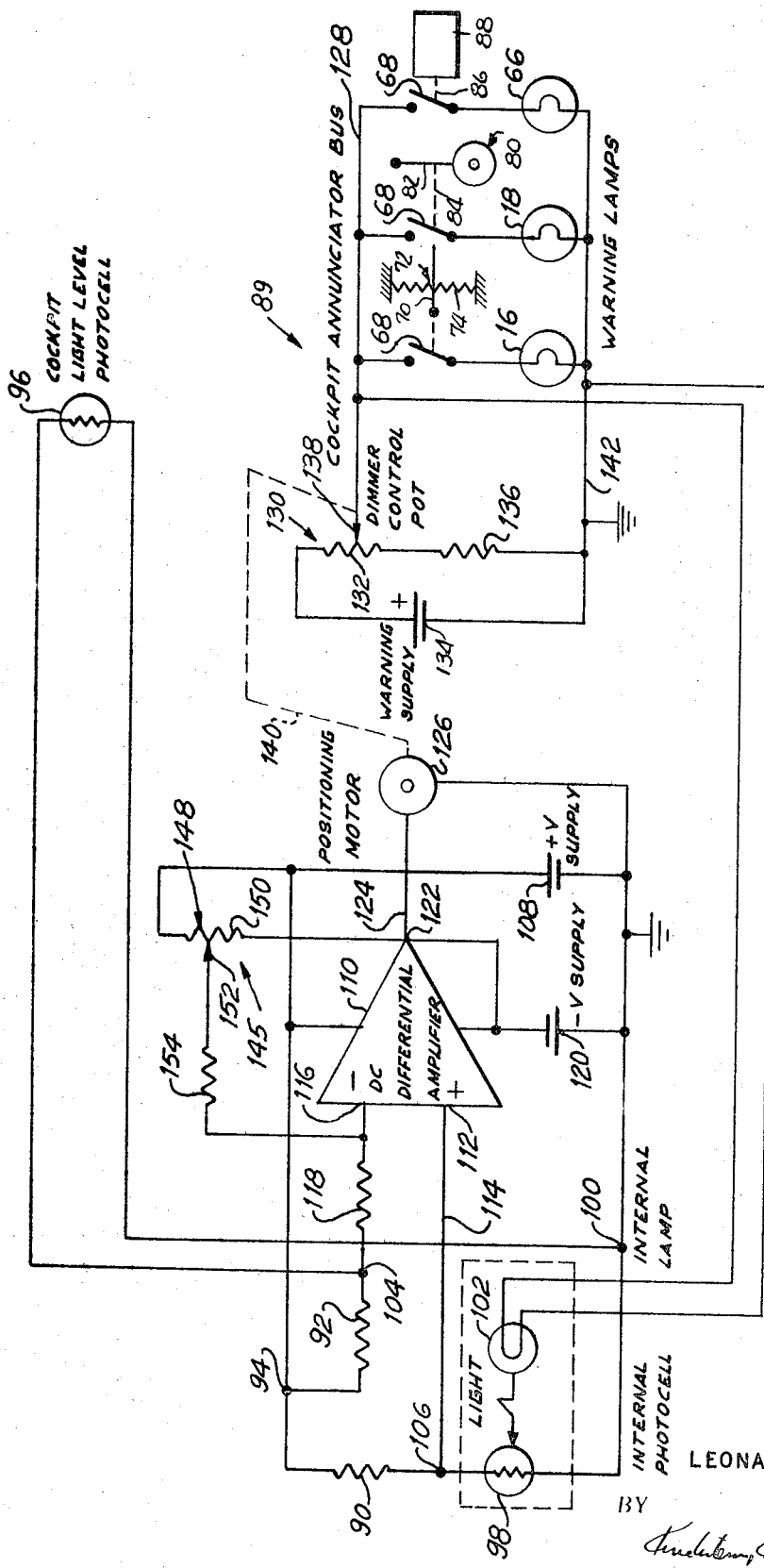
FIG. 4 is a view similar to FIG. 3 of a circuit embodying a more sophisticated form of the present invention.

In FIG. 4 there is illustrated a circuit embodying a modified form of the invention which achieves essentially the same function as the circuit of FIG. 3 but employs a bridge and null balancing arrangement instead of the voltage divider arrangement of FIG. 3. In FIG. 4, the reference numeral 89 denotes the circuit. The same includes a Wheatstone bridge the four arms of which constitute two resistors 90, 92 connected at adjacent terminals by a junction 94 and two photocells 96, 98 connected at adjacent terminals by a junction 100. The photocell 96 is located in the cockpit of the airplane so as to be responsive to ambient light conditions therein, optionally in the same fashion as the photocell 20. The photocell 98 is an internal photocell which is used as a reference, i.e., control. The photocell 98 is responsive only to the light emanating from an internal lamp 102. Preferably two photocells 96, 98 are in physical proximity to one another so as to be subjected to the same ambient temperature condition, whereby the two photocells will be similarly affected by any change in ambient temperature.

The other terminal of the resistor 92 is connected to the other terminal of the photocell 96 at a junction 104 and the other terminal of the resistor 90 is connected to the other terminal of the photocell 98 at a junction 106.

The junctions 94, 100 are the power input junctions to the bridge and are supplied with DC power from a positive voltage supply 108.

The junctions 106, 104 are the bridge output junctions. These junctions are connected to the control terminals of a DC differential amplifier 110, the junction 106 being directly connected to the non-inverting input control terminal 112 by a lead wire 114 and the junction 104 being connected to the input terminal 116 through an adding resistor 118. The amplifier 110 is supplied with positive power from the positive voltage source 108 and with negative power from the negative voltage source 120. The output from the amplifier 110 appears at the output terminal 122, where it is fed by a lead wire 124 to one terminal of a positioning motor 126 the other terminal of which is connected to ground.

The positioning motor 126 regulates the arming voltage on a cockpit annunciator bus 128 by means of a potentiometer 130. Said potentiometer includes a resistor 132 the opposite ends of which are connected to a warning voltage supply 134, one end of the resistor being directly connected to the positive side of said voltage supply and the other end being connected through a minimum level resistor 136 to the negative side of said supply. The potentiometer further includes an adjustable tap 138 which is connected to the cockpit annunciator arming bus 128. Said tap is physically controlled by the positioning motor, as through the medium of a control shaft 140, whereby the position of the tap on the resistor 132 is a direct linear function of the position of the shaft of the motor 126.

The circuit 89 further includes a series of annunciator lights 16, 18, 66, etc. arranged to be energized between the cockpit annunciator arming bus 128 and a ground bus 142 connected to the negative side of the warning voltage supply 134. Said lights are adapted to be connected in parallel, each being connected through a different switch 68 with which it forms a combination. Each of the three switches shown is under the control of a condition sensing device 72, 80 and 88, respectively, such condition sensing devices already having been described at some length in connection with FIG. 3.

Furthermore, the internal control light 102 is permanently connected without the interposition of the switch across the cockpit annunciator arming bus 128 and the ground bus 142, so that the light 102 burns steadily at an intensity that is a function of the level of the arming voltage applied to the bus 128 and which stands ready to be applied upon closure of the appropriate switches to any or all of the annunciator lamps 16, 18, 66, etc. As mentioned previously, the internal control light 102 faces the internal control photocell 98 so that the photocell 98 is activated by a light whose intensity varies as a function of the voltage standing ready to be applied to the annunciator lights 16, 18, 66, etc.

In the operation of the circuit 89, if the ambient light in the cockpit increases, the resistance of the photocell 96 will decrease. The bridge previously was balanced. The decrease in resistance unbalances the bridge, inasmuch as the resistance value of the photocell 98 has not yet changed. The unbalance of the bridge causes a voltage to appear across the bridge output terminals 104, 106. In the example given, the voltage at the terminal 116 will become less positive. This causes a positive voltage to appear at the terminal 122 which will drive the motor 126 in a direction to increase the voltage on the cockpit annunciator arming bus 128. The increased voltage raises the intensity of illumination of the interior light 102 and increases the intensity of light impinging on the photocell 98, thereby decreasing the effective resistance value of said cell. Such decrease causes a less positive voltage to appear at the terminals 106 and 112 tending to bring the amplifier back to a null condition, and at the same time to balance the bridge. Hence, the arming voltage that appears is of value such that the intensity of the illumination of the light 102 tends to follow the intensity of illumination of light impinging on the photocell 96. However, the electrical constants of the photocell and the resistance values of the resistors 90, 92 are so selected that the light 102 will have an intensity that is in excess of the intensity of the light in the cockpit sufficiently for such a light, if visible, to be noticeable over the general background of illumination in the cockpit. This, of course, is the same arming voltage that is applied to the lights 16, 18, 66, etc. so that when these lights are energized, they too will have a corresponding intensity of illumination sufficiently high to be visible against the general background illumination, i.e., intensity of light, in the cockpit.

Decrease of light falling on the photocell 96 reverses the direction of rotation of the motor 126 and thereby decreases the voltage appearing on the warning bus 128.

It will be appreciated that the motor 126 cannot reduce the arming voltage below a predetermined value determined by the resistance value of the resistor 136, thereby insuring that no matter how low the level of the light in the cockpit, the intensity of illumination of any one of the lights 16, 18, 66, when their corresponding switch 62 is closed, will be sufficiently bright to be visible.

Optionally, the light 102 can be arranged to illuminate an indicator 144 on the instrument panel or any other appropriate location in the cockpit, the same constituting, for example, a plastic dome of appropriate color, such as green. When this indicator is at a level corresponding approximately to the intensity of illumination in the cockpit, the pilot, merely by glancing at it, will know that the system is in proper operation. However, if the indicator should go dead, i.e., if the lamp 102 goes out, or if the light 102 is more brightly illuminated than cockpit illumination calls for, the pilot will know that something is amiss and will have appropriate repair steps taken.

If desired, the circuit 89 further may include an adjusting means for varying the normal operating brightness of the annunciator lights for a given cockpit level of light intensity to accommodate conditions existing in any particular aircraft or to accommodate for variations in electrical parameters of different circuit elements, such as the photocells. Said adjusting means is indicated by the reference numeral 145 and is in the form of a biasing circuit including a potentiameter 148 having its resistor 150 connected across the non-grounded sides of the positive voltage supply 108 and the negative voltage supply 120. The tap 152 of the resistor is connected to the inverting input terminal 116 through an adding resistor 154. By adjusting the position of the tap, more or less bias can be supplied to the terminal 116. Additional positive bias decreases the voltage on the arming bus 128.

Attention is called to the fact that if the value of the arming voltage on the bus 128 should change, either due to change in load or to change in voltage furnished by the warning supply 134, the system 89 is self-regulating because the internal light 102 will receive a correspondingly different voltage and the brightness of the light thrown by it on the photocell 98 will change, causing the bridge to be unbalanced and consequently the motor 126 to turn in a direction which automatically compensates for the change in voltage on the bus 128.

Although considerable detail has been given as to the two illustrated circuits for enabling the cockpit light level photocell to control the voltage on the cockpit annunciator warning buses, it is to be understood that the present invention is not to be limited to such specifics, inasmuch as various other circuit arrangements can be utilized for effecting such control regulation. By way of example, there is mentioned the ability to employ a phase shifting circuit or a multi-vibrator to control the starting pulse points of a silicon controlled rectifier the output of which feeds he cockpit annunciator warning buses.

Also, DC control and DC supply voltage furnishing circuits for the annunciator lights can be replaced by AC control of DC voltage furnishing circuits, DC control of AC voltage furnishing circuits, or AC control of AC voltage furnishing circuits without departing from the spirit of the invention.

It is desired to mention that the annunciator lights may have their envelopes colored or may be arranged to illuminate differently colored plastic domes. Moreover, the annunciator lights may be arranged to energize luminous characters or luminous symbols. Furthermore, the annunciator lights may be in various shapes to convey certain information to pilots. None of this, however, relates to the inventive novelty of the disclosed systems.

It thus will be seen that there have been provided systems which achieve the several objects of the invention and which are well adapted to meet the conditions of practical use.

As various possible embodiments might be made of the above invention, and as varous changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letters Patent:

1. An automatic regulator for an annunciator light in an airplane cockpit, said regulator comprising:
   (a) a light sensitive means in the airplane cockpit responsive to ambient light conditions in said cockpit,
   (b) a source of voltage,
   (c) a condition-responsive device which is responsive to a condition associated with the airplane of which it is desired to warn the pilot,
   (d) the combination of
       (1) an annunciator constituting an electrically energizable light source and
       (2) a normally open switch series connected to the annunciator and actuatable by the condition-responsive device for closure upon the occurrence of such condition, and
   (e) a control means regulated by the light sensitive means for supplying from the source of voltage to said combination a voltage which is a function of the level of light in the cockpit so that when the switch is closed the light source will be energized to an intensity which is a function of the light level in the cockpit, said control means being a null seeking means.

2. An automatic regulator for an annunciator light in an airplane cockpit, said regulator comprising:
   (a) a light sensitive means in the airplane cockpit responsive to ambient light conditions in said cockpit,
   (b) a source of voltage,
   (c) a condition-responsive device which is responsive to a condition associated with the airplane of which it is desired to warn the pilot,
   (d) the combination of
       (1) annunciator constituting an electrically energizable light source and
       (2) a normally open switch series connected to the annunciator and actuatable by the condition-responsive device for closure upon the occurence of such condition, and
   (e) a control means regulated by the light sensitive means for supplying from the source of voltage to said combination a voltage which is a function of the light level in the cockpit so that when the switch is closed the light source will be energized to an intensity which is a function of the light level in the cockpit, said control means including a DC differential amplifier, circuit means to regulate said amplifier by the light sensitive means, and a power amplifier connected to the source of voltage and to the DC differential amplifier to supply voltage to the combination.

3. An automatic regulator for an annunciator light in an airplane cockpit, said regulator comprising:
   (a) a light sensitive means in the airplane cockpit responsive to ambient light conditions in said cockpit,
   (b) a source of voltage,
   (c) a condition-responsive device which is responsive to a condition associated with the airplane of which it is desired to warn the pilot,
   (d) the combination of
       (1) an annunciator constituting an electrically energizable light source and
       (2) a normally open switch series connected to the annunciator and actuatable by the condition-responsive device for closure upon the occurrence of such condition and
   (e) a control means regulated by the light sensitive means for supplying from the source of voltage to said combination a voltage which is a function of the light level in the cockpit so that when the switch is closed the light source will be energized to an intensity which is a function of the light level in the cockpit, said control means including a DC differential amplifier, circuit means to regulate the amplifier by the light sensitive means, a positioning motor, circuit means controlling the positioning motor by the DC differential amplifier, and power regulating means connected to the source of voltage and controlled by the positioning motor to furnish the voltage that is supplied to the combination.

4. An automatic regulator as set forth in claim 1 wherein the control means includes a bridge having in one arm the light sensitive means and in another arm a second light sensitive means, said bridge being powered by the voltage source, wherein there further is included an electrically energizable light source energized by the voltage supplied by the control means, wherein the second light source is arranged to direct its light to the second light sensitive means, and wherein a voltage varying means is included which is regulated by the output of the bridge and which in turn supplies voltage to the combination.

5. An automatic regulator as set forth in claim 2 wherein circuit means connects the DC differential amplifier to the power amplifier in a follower configuration.

6. An automatic regulator for an annunciator light in an airplane cockpit, said regulator comprising:
   (a) A light sensitive means in the airplane cockpit responsive to ambient light conditions in said cockpit,
   (b) a source of voltage,
   (c) a condition-responsive device which is responsive to a condition associated with the airplane of which it is desired to warn the pliot,
   (d) the combination of
       (1) an annunciator constituting an electrically energizable light source and
       (2) a normally open switch series connected to the annunciator and actuatable by the condition-responsive device for closure upon the occurrence of such condition, and
   (e) a control means regulated by the light sensitive means for supplying from the source of voltage to said combination a voltage which is a function of the level of light in the cockpit so that when the switch is closed the light source will be energized to an intensity which is a function of the light level in the cockpit, said control means including a DC differential amplifier, circuit means to regulate the amplifier by the light sensitive means and power varying means regulated by the DC amplifier and supplying voltage to the combination.

References Cited

UNITED STATES PATENTS 3,366,834   1/1968   Potter _____ 315—158 XR

ALVIN H. WARING, Primary Examiner

U.S. Cl. X.R.

340—252, 382; 315—120, 154; 250—205